United States Patent [19]

Susnjara

[11] 4,378,959
[45] Apr. 5, 1983

[54] APPARATUS FOR PERFORMING WORK FUNCTIONS

[75] Inventor: Kenneth J. Susnjara, Santa Claus, Ind.

[73] Assignee: Thermwood Corporation, Dale, Ind.

[21] Appl. No.: 48,006

[22] Filed: Jun. 13, 1979

[51] Int. Cl.$^3$ .............................................. B25J 3/04
[52] U.S. Cl. ..................................... 414/732; 414/735
[58] Field of Search ..................... 414/4, 730, 732, 735

[56] References Cited

U.S. PATENT DOCUMENTS

| Re. 28,089 | 7/1974 | Devol | 414/732 X |
|---|---|---|---|
| 3,330,056 | 7/1967 | Woodside et al. | 414/732 X |
| 3,543,910 | 12/1970 | Devol | 414/730 X |
| 3,630,389 | 12/1971 | Schmidt | 414/4 |
| 3,840,128 | 10/1974 | Swoboda et al. | 414/732 X |
| 4,012,069 | 3/1977 | Carson | 414/735 X |
| 4,024,961 | 5/1977 | Stolpe | 414/730 X |
| 4,076,131 | 2/1978 | Dahlstrom et al. | 414/730 |

FOREIGN PATENT DOCUMENTS 619331  10/1976  U.S.S.R. ............................. 414/730

Primary Examiner—David A. Scherbel
Attorney, Agent, or Firm—Lalos, Leeds, Keegan, Lett & Marsh

[57] ABSTRACT

An apparatus for performing a work function on a workpiece comprising a stationary base, a rotatable base mounted on the stationary base, a hydraulically actuated mechanism for rotatably displacing the rotatable base relative to the stationary base, a lower arm member pivotally mounted on the rotatable base, a hydraulically actuated mechanism for angularly displacing the lower arm member relative to the rotatable base, an upper arm member pivotally mounted on the lower arm member, a hydraulically actuated mechanism for angularly displacing the upper arm member relative to the lower arm member, a wrist assembly mounted on the upper arm member, a hand member universally mounted on the wrist assembly, a hydraulically actuated mechanism for angularly displacing the hand member relative to the wrist assembly, a mechanism disposed on the hand member for mounting a work tool, the stationary and rotatable bases including a rotary fluid slip ring assembly, and an assembly for transmitting fluid between the stationary base and the hydraulically actuated mechanism through the fluid slip ring assembly for operating the hydraulically actuated assembly. The rotatable base is rigidly secured to the rotary fluid slip ring assembly.

32 Claims, 22 Drawing Figures

APPARATUS FOR PERFORMING WORK FUNCTIONS

This invention relates to an apparatus for performing a work function on a workpiece and more particularly to an apparatus commonly referred to commercially as an industrial robot.

In many manufacturing processes, there are a number of work functions which are comparatively simple, consistent and repetitive in nature. Examples of such work functions are article handling, such as loading and unloading a machine or transferring an article from one work station to another, spray painting, welding, brazing, flame cutting and the like. Traditionally, such work functions have been performed by relatively low skilled workers. Because of the uninteresting and tedious nature of such work and the difficulty in acquiring dependable low skilled workers to perform such work, it has been found to be desirable, particularly from the viewpoints of continuity of production, productivity and quality control, to provide a mechanical apparatus or what has been commonly referred to as an industrial robot to perform such functions.

In the prior art, there has been a number of mechanical robot systems developed and utilized in various industries, particularly the automotive industry. Typically, such systems have consisted of a mechanical apparatus or robot in the form of an arm which carries and positions a working tool for performing a work function, a power unit for powering the motions of the mechanical apparatus and a control unit which may be programmed to control the motions of the mechanical apparatus. It further has been found, however, that because of various factors including high-investment costs, lack of versatility and low reliability, commercially available robots have not been entirely satisfactory for commercial purposes.

Accordingly, it is the principal object of the present invention to provide an improved apparatus for performing a mechanical work function.

Another object of the present invention is to provide an improved apparatus commonly referred to commercially as an industrial robot.

A further object of the present invention is to provide an improved apparatus for performing a mechanical work function in accordance with a selected program.

A still further object of the present invention is to provide an improved apparatus for performing a mechanical work function which is operable in either a continuous path mode for use in such work functions as spray painting and welding or a point-to-point mode for use in such work function as article handling and transferring.

Another object of the present invention is to provide an apparatus for performing a mechanical work function which resembles and operates similar to a human arm and hand.

A further object of the present invention is to provide an improved apparatus for performing a mechanical work function having an articulated assembly movable about six separate axes.

A still further object of the present invention is to provide a commercially feasible apparatus for performing a mechanical work function which is sufficiently flexible and versatile for use in a variety of applications ranging from comparatively unsophisticated use, such as in performing routine production functions in industrial applications to comparatively sophisticated use, such as performing high-level and delicate functions, as in research laboratories.

Another object of the present invention is to provide an improved apparatus for performing a mechanical work function which may be used in commercial and industrial applications to assure continuity of production, increased productivity and improved quality control.

A further object of the present invention is to provide an improved apparatus for performing a mechanical work function suitable for use in a wide variety of applications which is comparatively inexpensive to manufacture, versatile and reliable in performance.

Other objects and advantages of the present invention will become more apparent to those persons having ordinary skill in the art to which the present invention pertains from the following description taken in conjunction with the accompanying drawings wherein:

FIG. 11 is a vertical, cross-sectional view of the wrist assembly and component shown in FIG. 10, having portions thereof broken away;

FIG. 12 is a cross-sectional view taken along line 12—12 in FIG. 11;

Figure 1:
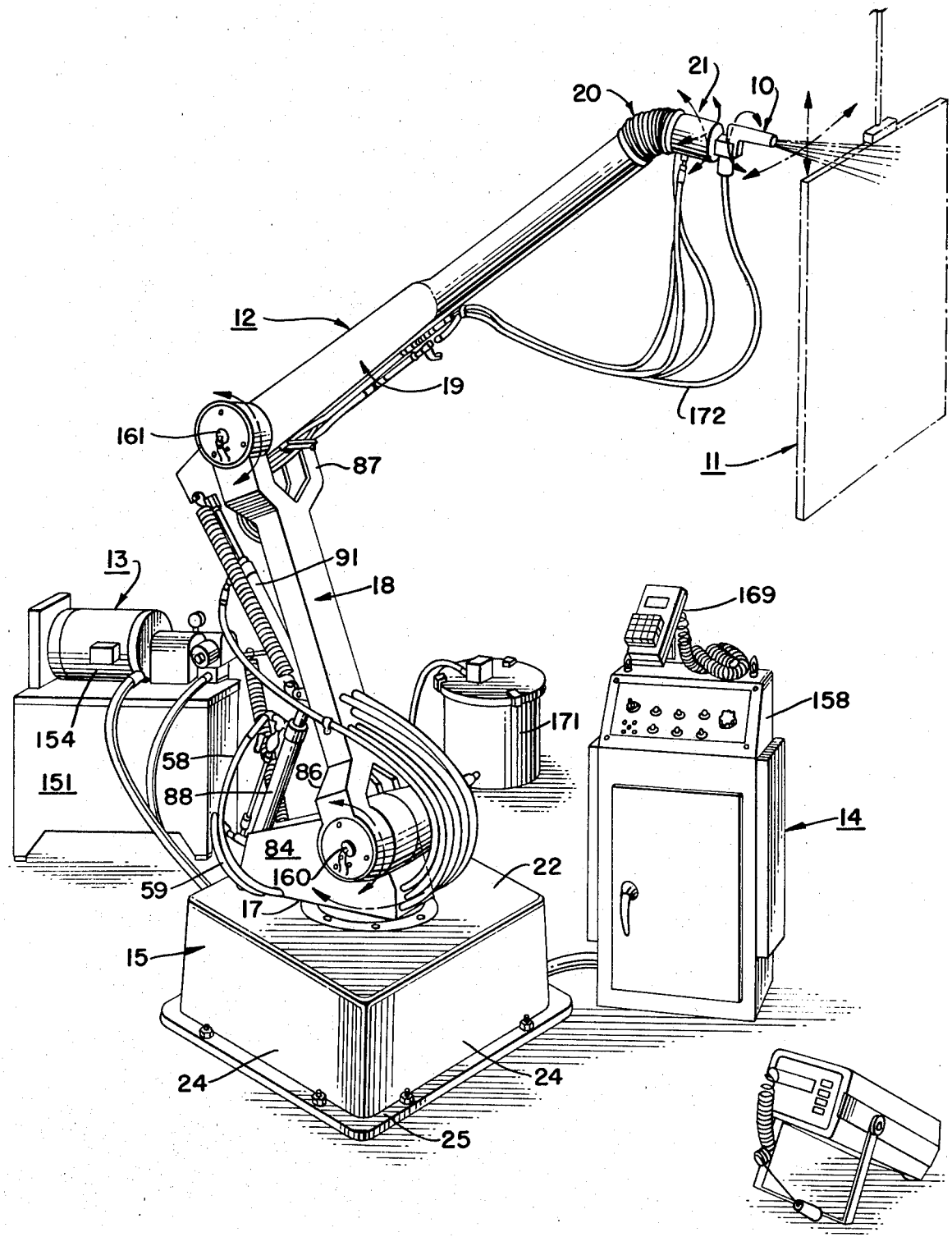
FIG. 1 is a perspective view of a system for automatically performing a mechanical work function according to a selected program, embodying the present invention.

Referring to FIG. 1, there is illustrated a system for performing a mechanical work function which generally consists of a work tool 10 which is adapted to perform a work function on a workpiece 11, a unit 12 for manipulating the work tool 10, a unit 13 for powering the motions of manipulator unit 12 and a system 14 for controlling the motions of the manipulator unit. Generally, the manipulator unit consists of a stationary base member 15, a fluid slip ring assembly 16 mounted on the stationary base member, a rotatable base member 17 mounted on the fluid slip ring assembly, a lower arm member 18 pivotally mounted at the lower end thereof on the rotatable base member, an upper arm member 19 pivotally mounted on the upper end of the lower arm member, a wrist assembly 20 mounted on the free end of the upper arm member and a member 21 which is mounted on the wrist assembly and which supports working tool 10.

Figure 5:
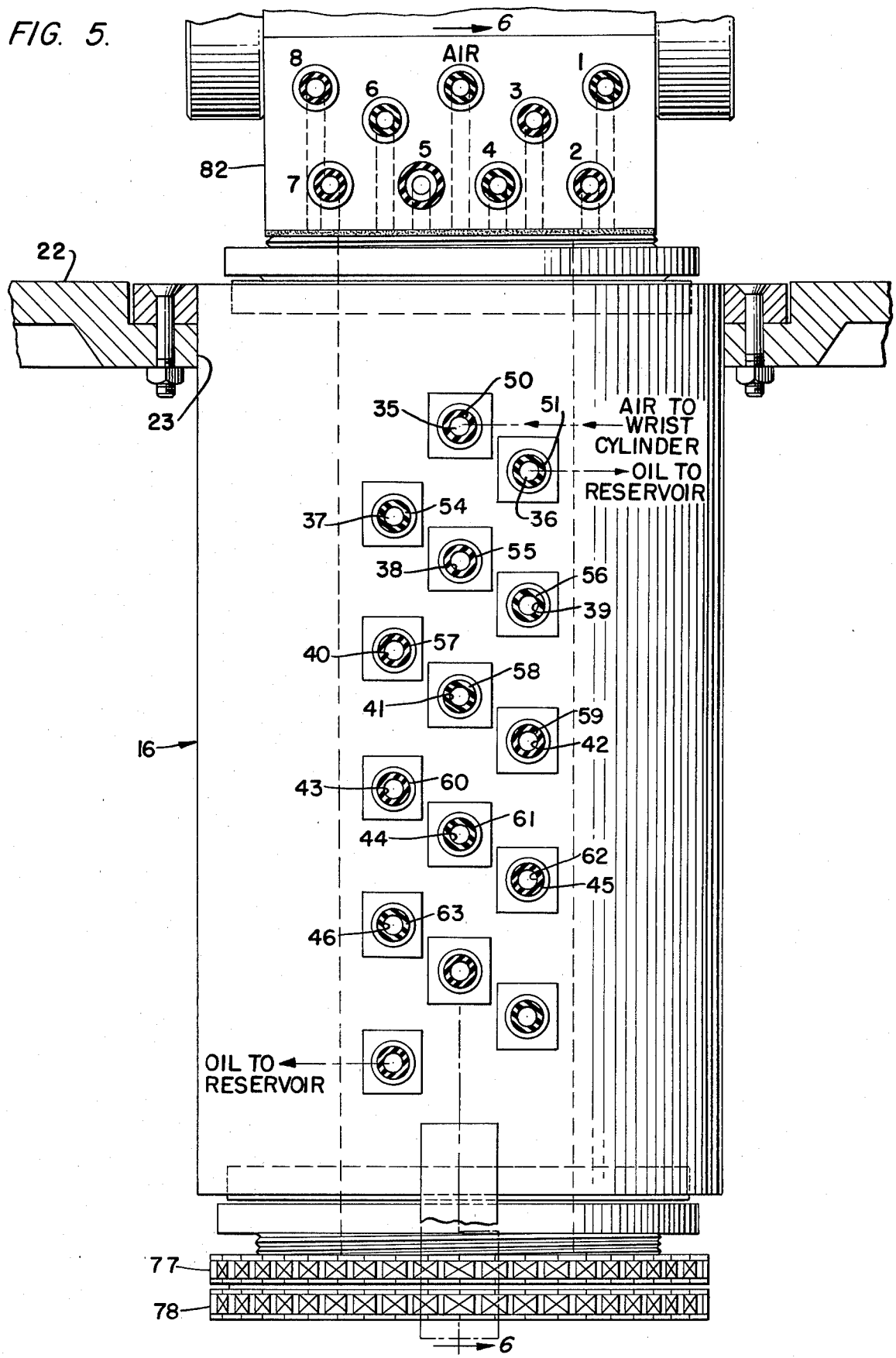
FIG. 5 is an enlarged, side-elevational view of a fluid slip ring assembly of the manipulator unit shown in FIGS. 1 through 4.
Figure 6:
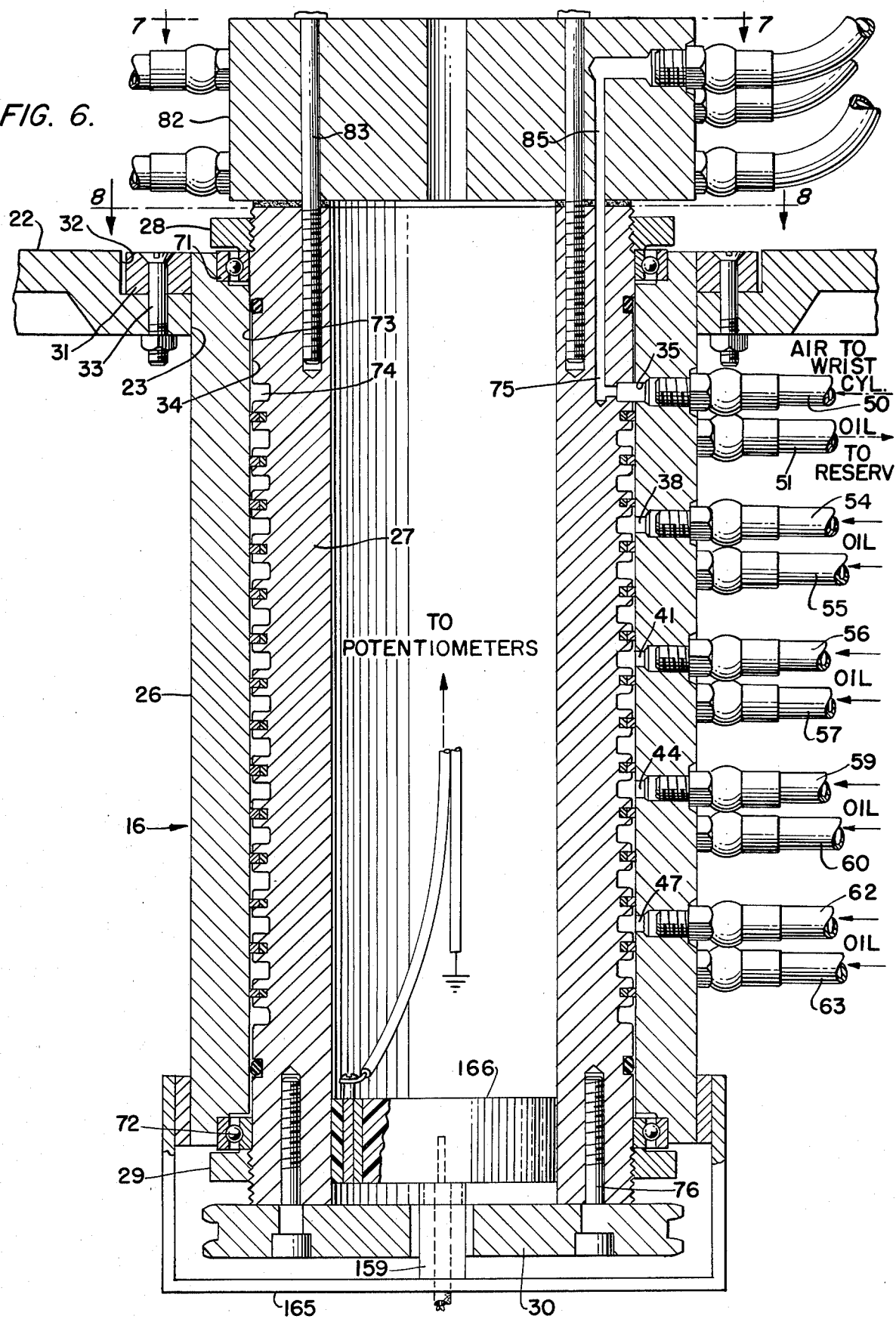
FIG. 6 is a cross-sectional view taken along line 6—6 in FIG. 5.
Figure 7:
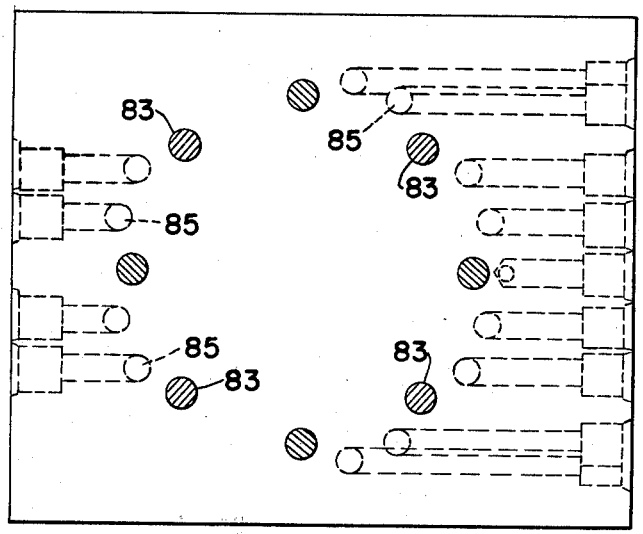
FIG. 7 is a cross-sectional view taken along line 7—7 in FIG. 6.
Figure 8:
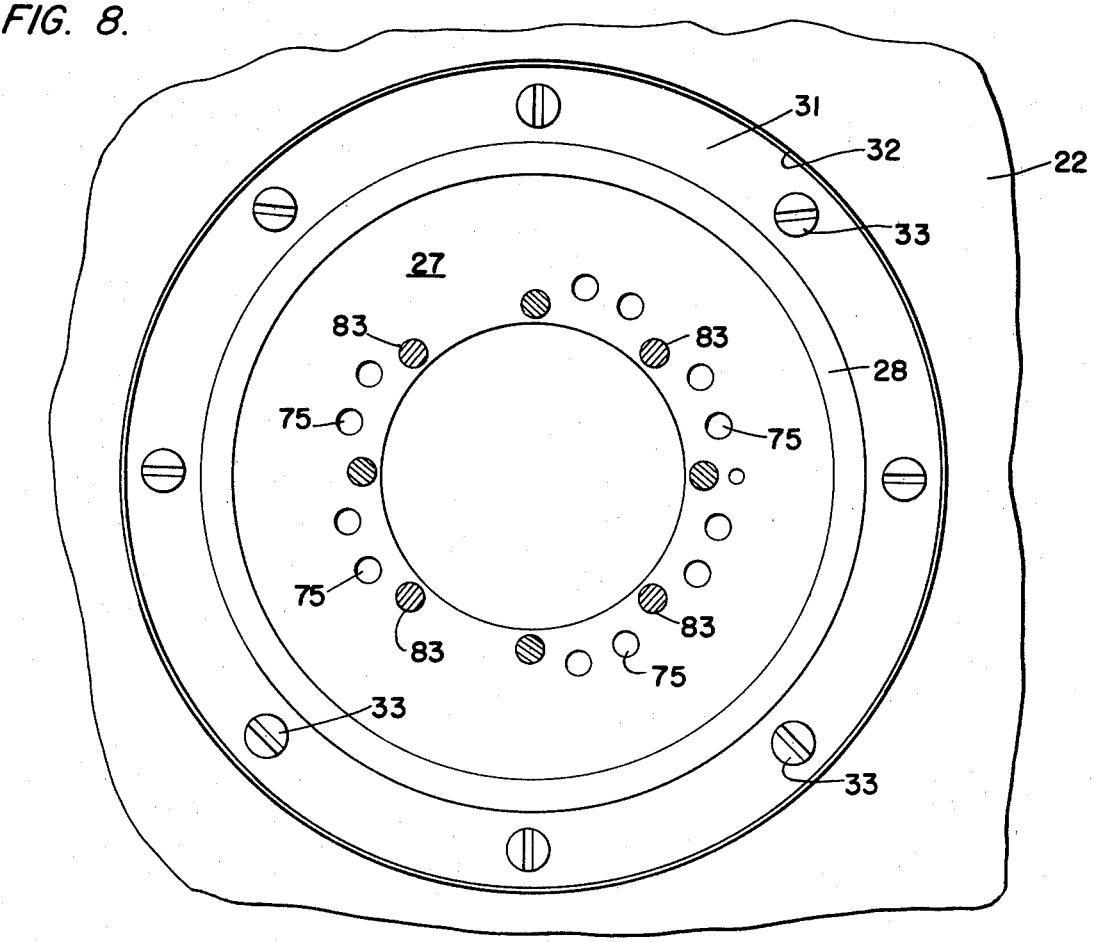
FIG. 8 is a cross-sectional view taken along line 8—8 in FIG. 6.

Stationary base member 15 is basically a support structure consisting of a top wall 22 having a circular opening 23 in the center thereof, a set of sidewalls 24 and a peripheral flange 25 formed along the lower ends of the sidewalls for rigidly securing the stationary base member to the floor or another support surface by means of bolts. As best illustrated in FIGS. 5 and 6, slip ring assembly 16 is supported on the upper wall of the stationary base member and projects into the base member through center opening 23. Generally, the slip ring assembly includes a stationary cylindrical member 26, a rotatable cylindrical member 27, upper and lower threaded retainer rings 28 and 29, and a sprocket 30. The upper end of cylindrical member 26 is provided with an annular flange 31 which is adapted to be seated in an annular recess 32 provided in upper wall 22 about the periphery of opening 23 when the cylindrical member is received within an opening 23. Cylindrical member 26 is rigidly secured to the stationary base member by means of a plurality of sets of bolts and nuts 33. The inner side of cylindrical member 26 is provided with a cylindrical surface 34 which is adapted to cooperate with rotatable cylindrical member 27. As best shown in FIGS. 5 and 6, cylindrical member 26 is provided with a set of ports 35 through 46 which communicate through a plurality of fluid lines 50, 51 and 54 through 63 with a plurality of two stage, electrohydraulic servovalves 65 through 70 which are supplied with fluid under pressure from power unit 13, as will later be described.

The upper and lower ends of cylindrical surface 34 of member 26 are provided with recesses in which there is seated a set of bearings 71 and 72. Rotatable cylindrical member 27 is journaled in bearings 71 and 72 and is provided with threaded ends on which retainer rings 28 and 29 are threaded to engage bearings 71 and 72 and thus support rotatable cylindrical member 27 in stationary cylindrical member 26. Rotatable member 27 also is provided with an outer cylindrical surface 73 which is disposed in sliding engaging with cylindrical surface 34 of stationary member 26, and is provided with a plurality of grooves 74 which register with ports 35 through 49 of stationary member 26 to provide a plurality of fluid passageways between the stationary and rotary members of the slip assembly. Rotatable member 27 also is provided with a plurality of longitudinally disposed passageways 75 which communicate with annular grooves 74 as best seen in FIG. 6.

Figure 2:
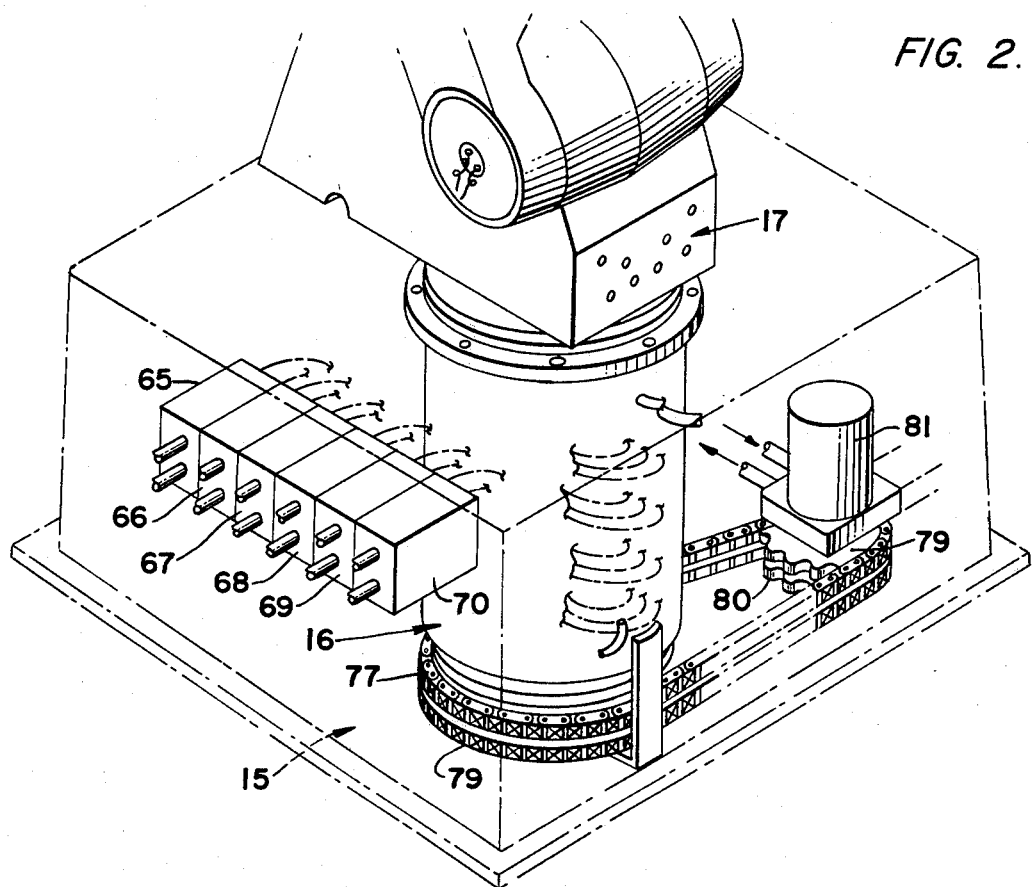
FIG. 2 is a perspective view of a drive system for the manipulator unit comprising a component of the system shown in FIG. 2.

Sprocket 30 is mounted on the lower end of rotatable member 27 and is secured thereto by a plurality of bolts 76. The sprocket is provided with two sets of sprocket teeth which are connected by means of two drive chains 77 and 78 to a set of drive sprockets 79 and 80 as best shown in FIG. 2. Drive sprockets 79 and 80 are driven by a hydraulically powered rotary motor 81 which is supplied with fluid under pressure from a two-stage electrohydraulic servovalve 70 through fluid lines 52 and 53.

Rotatable base member 17 generally consists of a support block 82 seated on and rigidly secured to the upper end of rotatable slip ring member 27 by means of a plurality of bolts 83, and a housing 84 mounted on the support block. Support block 82 is provided with a plurality of fluid passageways 85 which communicate at one set of ends with fluid passageways 75 provided in slip ring member 27 and communicate at another set of ends with fluid lines 54 through 63 connected to various actuating mechanisms on the manipulator unit, as will later be described.

Lower arm member 18 consists of a box-type structural form having a bifurcated lower end 86 pivotally mounted on a shaft mounted on housing 84 of the rotatable base member, and a bifurcated upper end 87. The lower arm member is displaced angularly relative to the rotatable base member by means of a hydraulically actuated cylinder assembly 88 supplied by fluid lines 58 and 59.

Figure 3:
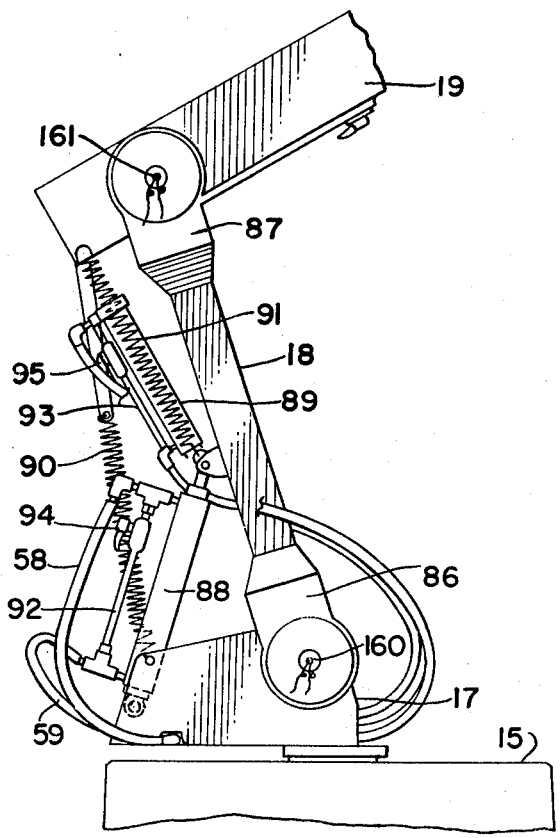
FIG. 3 is a side-elevational view of the manipulator unit shown in FIG. 1.
Figure 4:
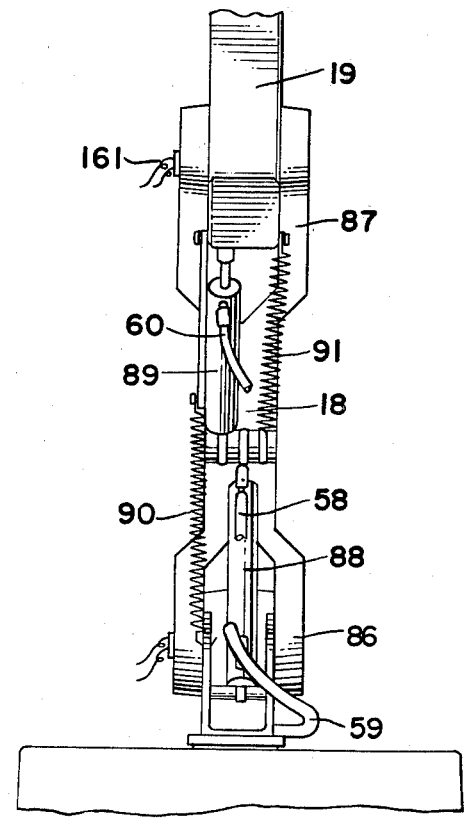
FIG. 4 is a rear, elevational view of the manipulator unit shown in FIG. 1.

Upper arm member 19 also is of a box-type structural form and is provided with a mounting shaft which is journaled in the bifurcated upper end 87 of lower arm member 18. It is angularly displaced relative to the lower arm member by means of a hydraulically actuated cylinder assembly 89 supplied by fluid lines 60 and 61. A set of springs 90 interconnecting rotatable base member 17 and a rear end of upper arm member 19 and 91 interconnecting the lower arm member and a rear end portion of the upper arm member are provided to counterbalance the upper and lower arm members. In addition, as best illustrated in FIG. 3, the cylinders of cylinder assemblies 88 and 89 are provided with bypass lines 92 and 93 provided with valves 94 and 95, respectively, which may be operated to intercommunicate the rod and cylinder ends of the cylinder portions of such assemblies during the programming of control system 14, as will later be described.

Referring to FIGS. 9 through 12, wrist assembly 20 includes a cylindrical support block 96 mounted in the free end of the upper arm member, having an axially disposed bore 97 and radially spaced bores 98, 99 and 100, spaced 120° apart. Rigidly mounted in axial bore 97 is a stationary support rod 101 which projects forwardly and rearwardly of the support block. The rearwardly projecting portion of support rod 101 is threaded, on which there is threaded a mounting plate 102, locked in position by a nut 103 threaded on the rearwardly projecting end of support rod 101 and drawn up tight against the mounting plate. A nut 104 also is threaded on the rearward end of the support rod and is drawn up tight against the rear end wall of the support block. The forwardly projecting portion of support rod 101 is connected to a mounting plate 105 of member 21 through a universal connection 106 to permit universal motion of the member relative to the upper arm member.

Figure 9:
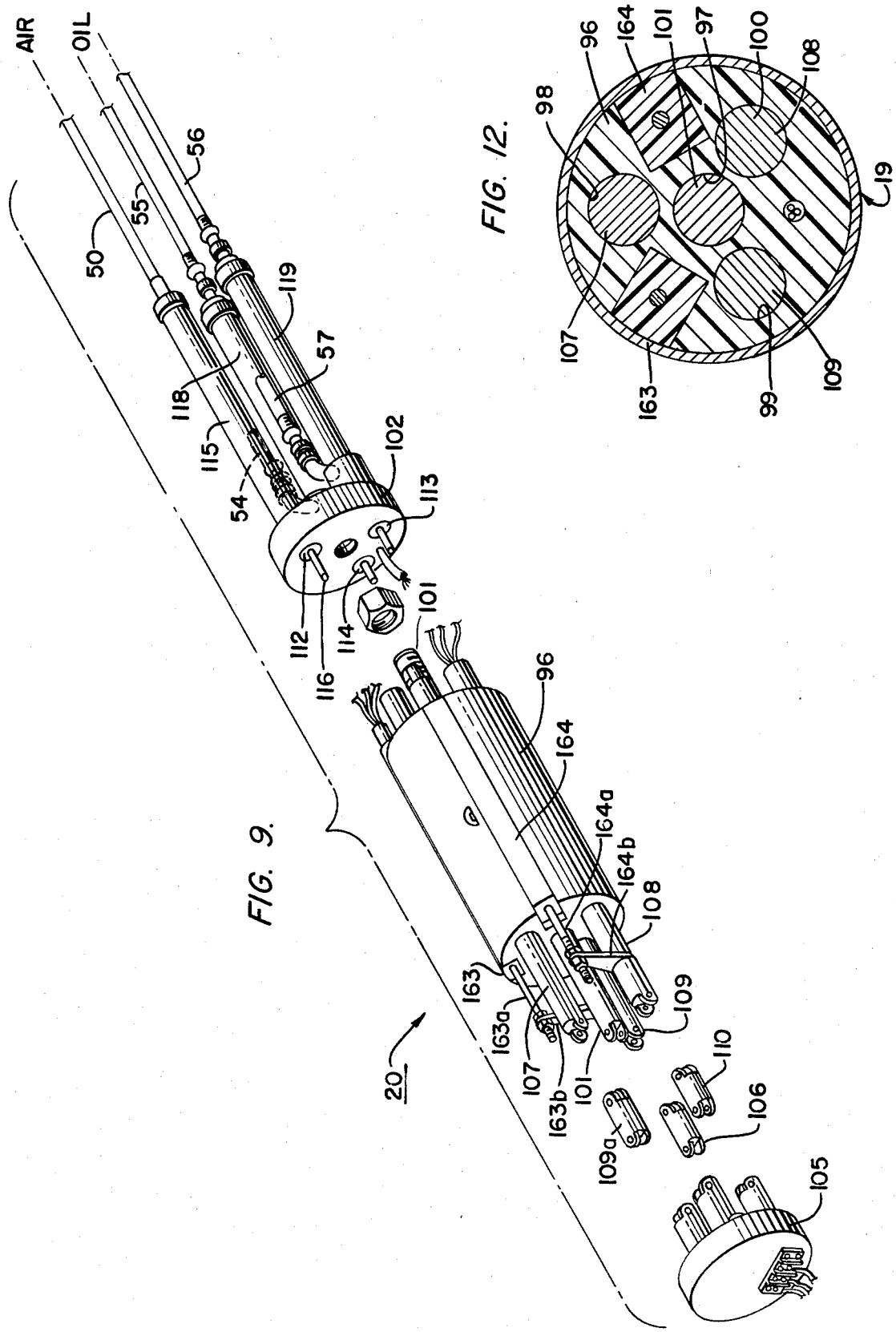
FIG. 9 is a perspective view of a wrist assembly and member of the manipulator unit shown in FIG. 1, illustrating some of the components thereof in exploded relation.
Figure 10:
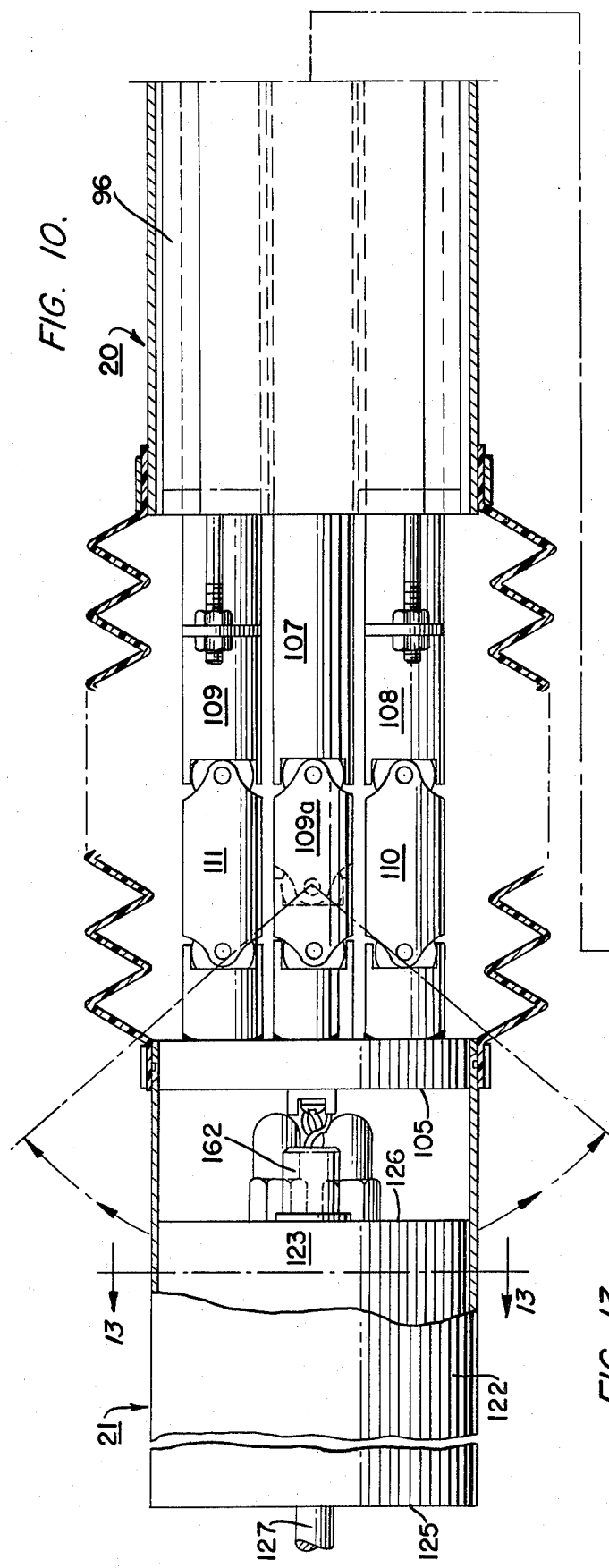
FIG. 10 is an enlarged, top plan view of the wrist assembly and component shown in FIG. 9.
Figure 13:
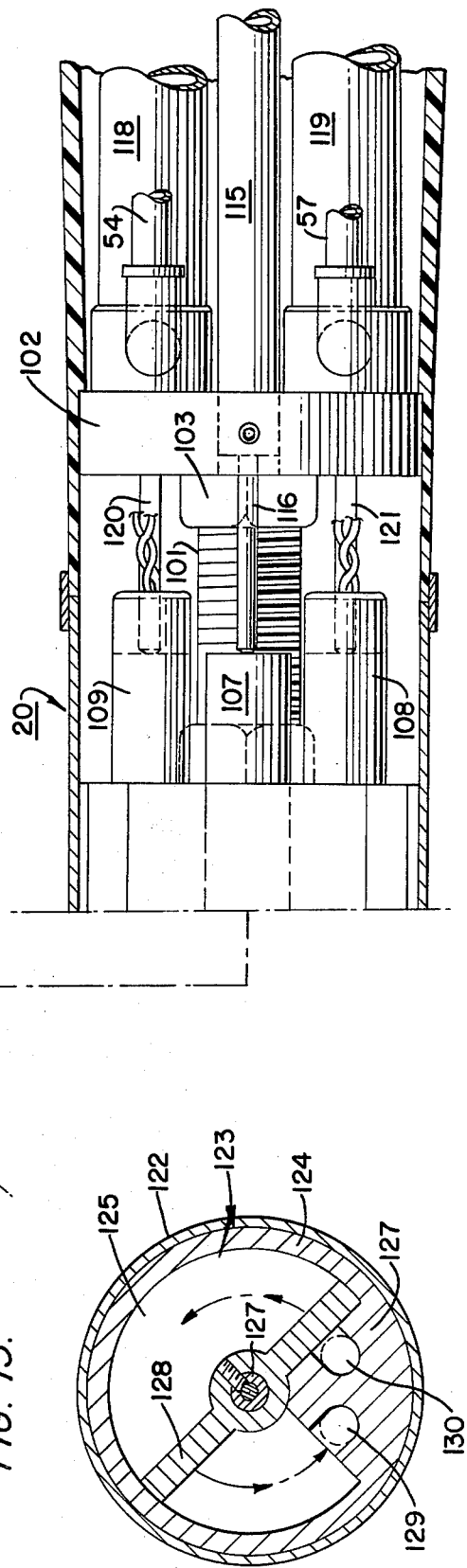
FIG. 13 is a cross-sectional view taken along line 13—13 in FIG. 10, illustrating a hydraulically powered rotary actuator mounted in the member of the manipulator unit.
Figure 14:
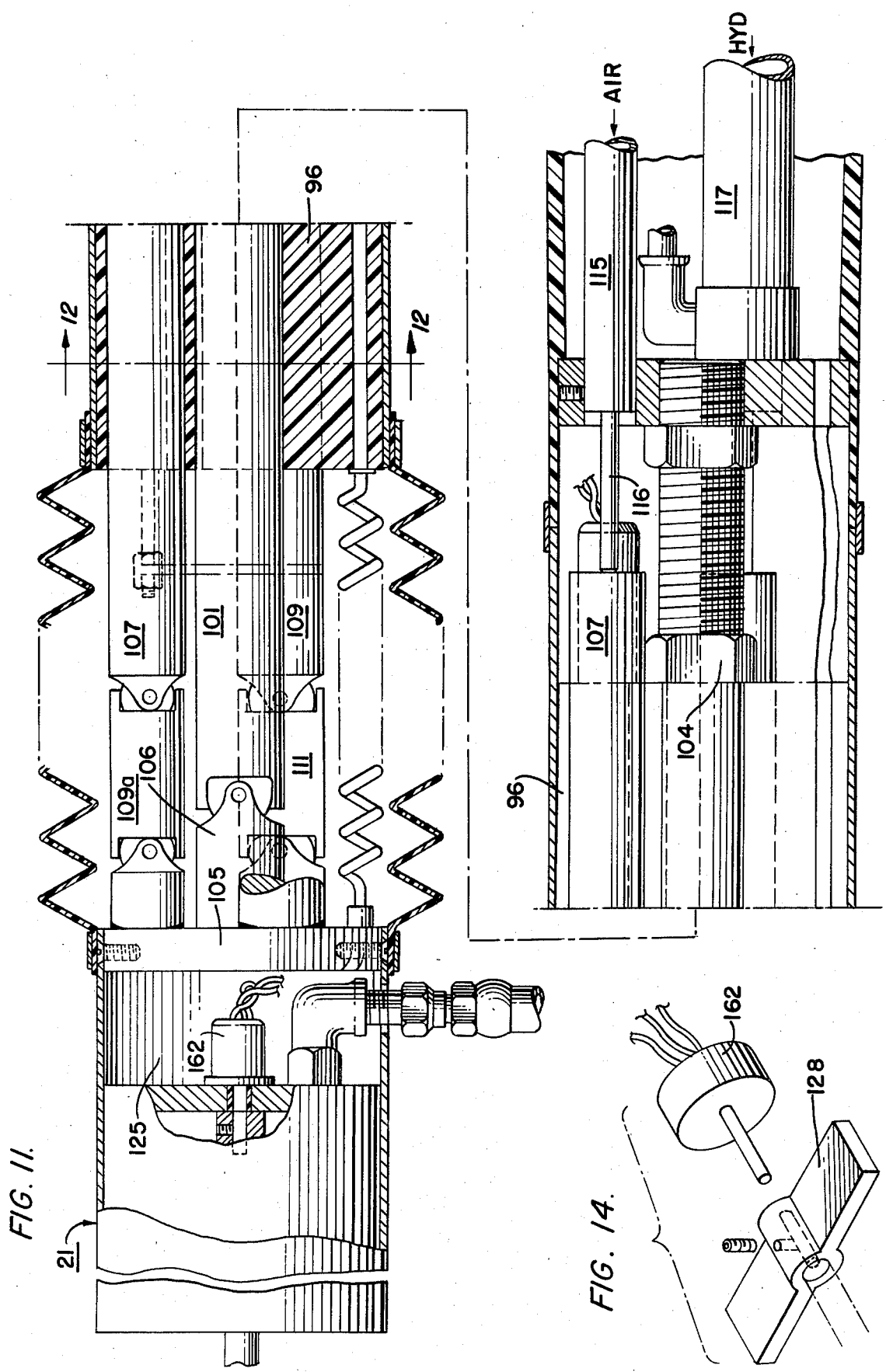
FIG. 14 is a perspective view of certain components of the rotary actuator shown in FIG. 13, illustrating the components in exploded relation.

Slidably mounted in bores 98, 99 and 100 are push rods 107, 108 and 109, respectively, which have sufficient lengths to project beyond the front and rear ends of the support block. As best shown in FIGS. 9 and 10, push rod 107 is connected to mounting plate 105 of the member through a universal connection 109a, push rod 108 is connected to mounting plate 105 by means of a universal connection 110 and push rod 109 is connected to mounting plate 105 through a universal connection 111.

Mounting plate 102 is mounted in the front end of the upper arm member and is provided with a set of openings 112, 113 and 114 which are longitudinally aligned with push rods 107, 108 and 109, respectively. As best shown in FIGS. 10 and 11, a pneumatically actuated cylinder assembly 115 is mounted in opening 112, having a rod 116 engageable with the end of push rod 107. Air under pressure is supplied to the cylinder of assembly 115 through air line 50 which communicates through the fluid slip ring assembly with a source of air under pressure. Air cylinder 115 functions as a spring to yieldably bias push rod 107 forwardly and angularly displace the member relative to the upper arm member about a first axis.

Also mounted on mounting plate 102 is a set of hydraulically actuated rod and cylinder assemblies 118 and 119 having the front ends of the cylinders thereof rigidly secured to the rear face of mounting plate 102 and the rod portions 120 and 121 projecting through openings 114 and 113 and engaging the rear ends of push rods 109 and 108, respectively. Fluid under pressure is supplied to the end of the cylinder of cylinder assembly 118 by means of fluid lines 54 and 55. Similarly, fluid under pressure is supplied to the ends of the cylinder of cylinder assembly 119 through fluid lines 56 and 57. It will be appreciated that both cylinder assemblies 118 and 119 can be operated to extend and retract rods 120 and 121 simultaneously to counteract the biasing action of cylinder assembly 115 and angularly displace the member relative to the upper arm member about the aforementioned first axis and cylinder assemblies 118 and 119 can be operated independently or together but in different directions to angularly displace the member relative to the upper arm member about a second axis perpendicular to the aforementioned first axis. It further will be appreciated that cylinder assemblies 118 and 119 can be operated in a variety of ways depending upon the amount and direction of fluid supplied to the cylinders thereof in response to command signals generated by the control system and will cooperate with the biasing action of cylinder assembly 115 to move the member universally relative to the upper arm member and position the member in various selected attitudes relative to the upper arm member.

In the preferred embodiment of the wrist assembly, a pneumatic cylinder assembly is utilized to yieldingly bias the member about the aforementioned first axis, hydraulic cylinder assemblies are used to angularly displace the member about the aforementioned second axis and the rod members of the cylinder assemblies are not connected directly through universal connections with the member but instead are drivingly engageable with push rods which are connected to the member through universal connections. However, within the scope of the invention, other equivalent components may be used. Examples of alternate equivalent components are three hydraulically actuated cylinder assemblies, a mechanical spring or other form of biasing device in lieu of the pneumatically actuated cylinder assembly and positive connections of the rods of the cylinder assemblies through universal connections with the member. In the preferred embodiment of the invention, push rods are used so that the rods of the hydraulic cylinder assemblies are, in effect, single acting, thus simplifying the programming of the computer of the control system. Furthermore, although in the preferred embodiment of the invention, the displacing means in the form of the pneumatically and hydraulically actuated cylinder assemblies are spaced 120° apart, it is necessary only that the hydraulically actuated cylinder assemblies are spaced angularly relative to the pneumatically actuated cylinder assembly sufficiently to provide a counteracting force or forces with respect to the force produced by the biasing action of the pneumatically actuated cylinder assembly. In the embodiment as shown, the hydraulically actuated cylinder assemblies may be displaced relative to the pneumatically actuated cylinder assembly by any angles greater than 90° for the wrist assembly to function in the intended manner.

Member 21 generally consists of mounting plate 105, a cylindrical casing 122 mounted on the mounting plate and a hydraulically powered rotary actuator 123 mounted in the front end of casing 122. Actuator 123 includes a cylindrical wall 124, front and rear end walls 125 and 156, a shaft 127 journaled in the end walls, a stationary barrier or shoe portion 127 and a vane 128 mounted on shaft 127 and rotatably displaceable between the angularly spaced surfaces of barrier 127. The vane of the actuator is capable of developing instant torque in either direction by means of fluid under pressure supplied through fluid lines 62 and 63 and fluid passageways 129 and 130 in the body of the actuator.

Figure 15:
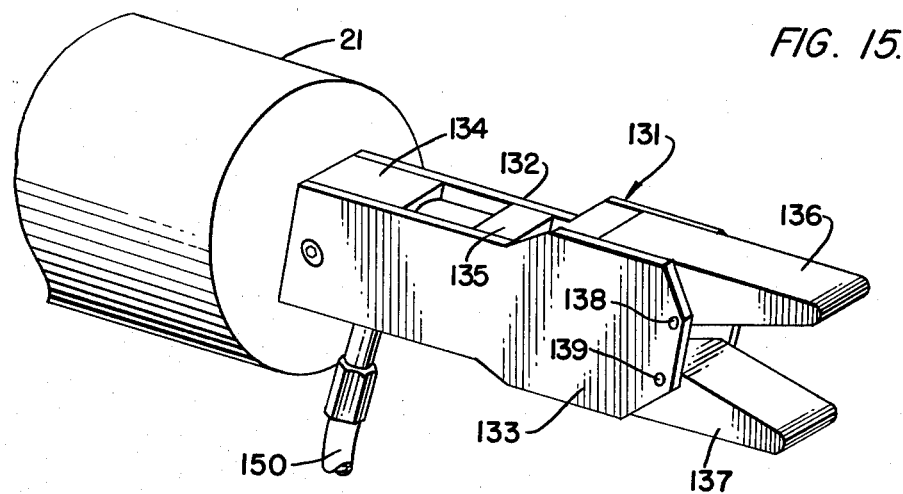
FIGS. 15 through 18 are perspective, top, bottom and side-elevational views of a tool holding device mounted on the member of the manipulator unit shown in FIG. 1.
Figure 16:
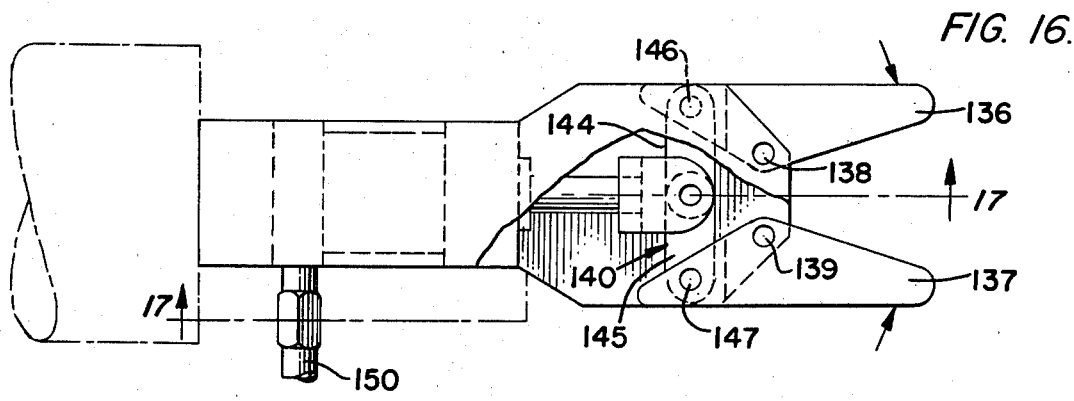
Figure 17:
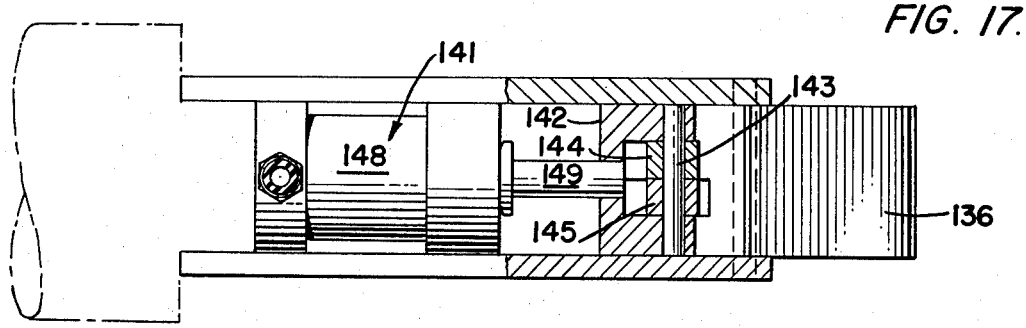
Figure 18:
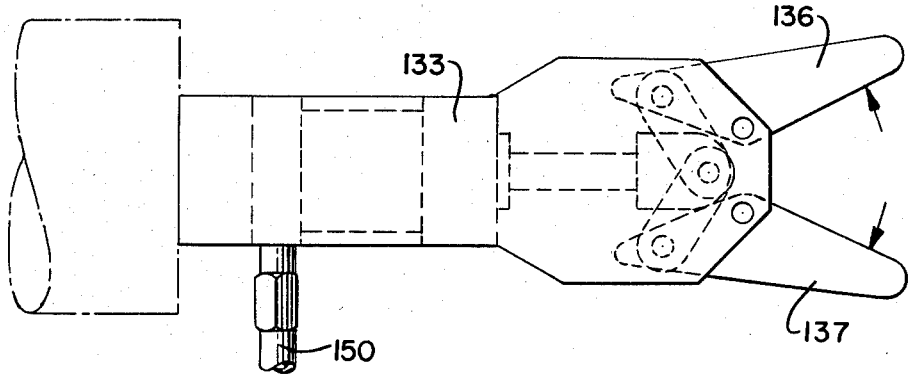

Referring to FIGS. 15 through 18, there is shown a holding mechanism 131 which may be mounted on shaft 127 of actuator 123 mounted in the member, for gripping an article such as a component being moved from one work station to another. The mechanism generally consists of a pair of plate members 132 and 133 interconnected by a set of crosspiece members 134 and 135, a set of gripping elements 136 and 137 pivotally connected to side plates 132 and 133 by a set of pins 138 and 139, an actuating linkage 140 operatively connected to the gripping elements and a hydraulically actuated cylinder assembly 141. Linkage 140 consists of a C-shaped element 142 having a connecting pin 143 and a set of links 144 and 145 pivotally connected at their inner ends to pin 143 and pivotally connected to the outer ends of the gripper elements by means of connecting pins 146 and 147. Cylinder assembly 141 includes a cylinder 148 mounted on the sidewall plates and a rod 149 connected at the outer end thereof to C-shaped element 142 of linkage 140. It will be appreciated that, when air under pressure is supplied through air line 150, the rod of the cylinder assembly will be caused to retract to close the gripper elements, as shown in FIGS. 15 and 16 and, when the air under pressure is removed, the rod will be permitted to extend to open the gripper elements as shown in FIG. 18.

In the embodiment shown in FIG. 1, the tool holding mechanism 131 is adapted to hold spray gun 10 which is supplied paint from a container 171 and air through a line 172 which is sprayed on workpiece 11. The spray gun is positioned and aimed at the workpiece in accordance with the program inputted into the control system.

In addition to the use of a mechanical tool or article holding or gripping device, it is contemplated that any other type of holding device can be mounted on the member, depending on the work function, such as magnetic and vacuum devices.

Figure 19:
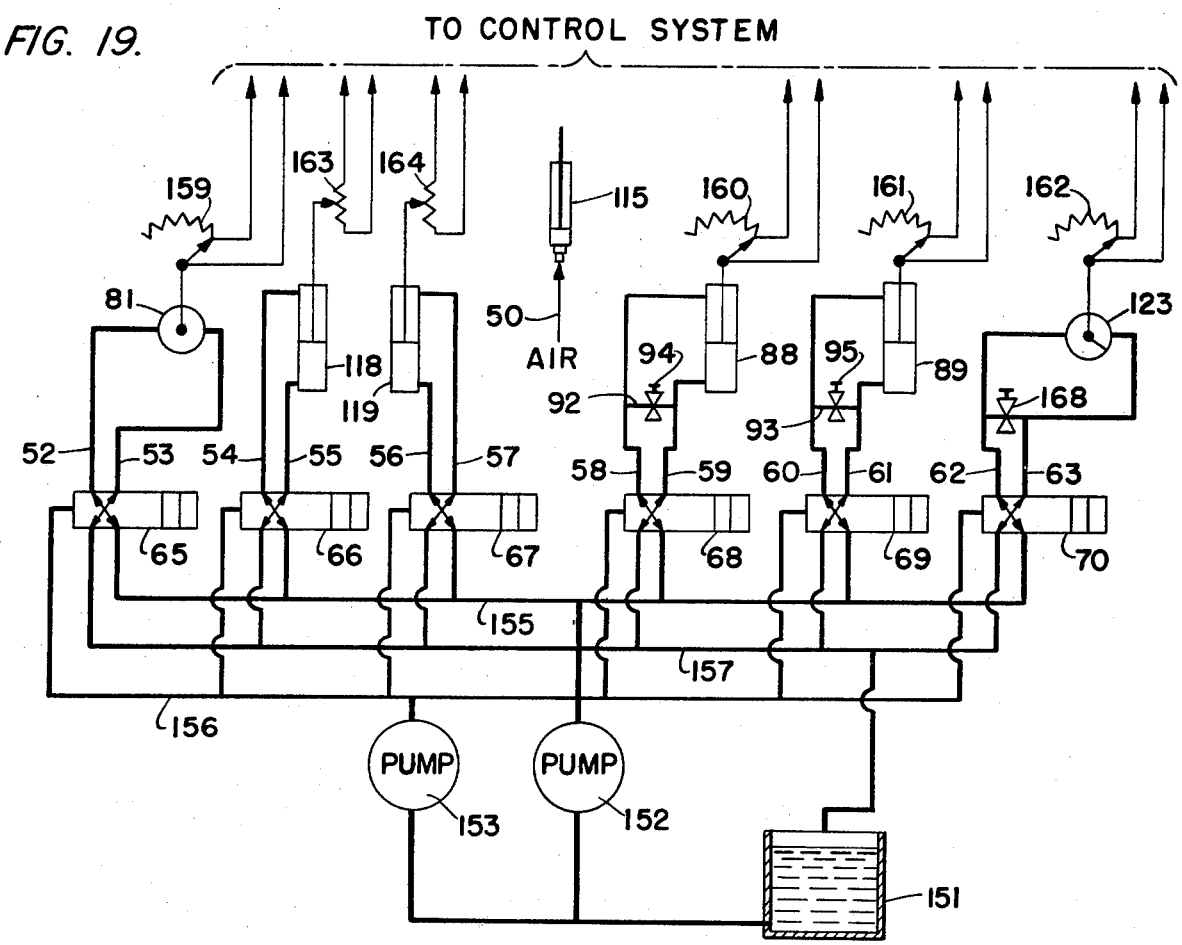
FIG. 19 is a diagrammatic-schematic view of the hydraulic control system for the manipulator unit shown in FIG. 1.
Figure 20:
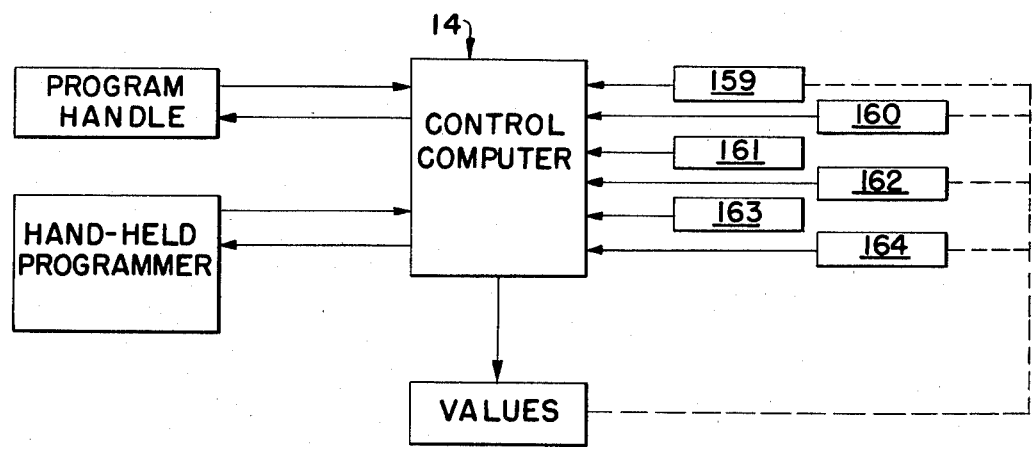
FIG. 20 is a diagrammatic view of the electrical control system for operating the valves of the hydraulic control system shown in FIG. 19.

Power unit 13 is of a conventional, commercially available type, including an oil reservoir tank 151, a set of tandem pumps 152 and 153 of the variable volume, pressure-compensated type driven by a motor 154, and an appropriate filter assembly. As shown in FIG. 19, pump 152 supplies fluid under pressure through pressure line 155 to valves 65 through 70, and pump 153 supplies fluid under pressure through pilot line 156 to the spool ends of valves 65 through 70. Fluid is returned from the valves to reservoir 151 through a return line 157.

Control system 14 includes a micro-processor computer which functions in the conventional manner in comparing the actual position of the manipulator unit with the programmed position, determining the position error and correspondingly generating command signals for selected valves of control valves 65 through 70 for correcting the error. The positions of the components of the manipulator unit are sensed by rotary potentiometers 159 through 162 and linear potentiometers 163 and 164. Referring to FIG. 6, rotary potentiometer 159 is mounted on a support bracket 165 depending from stationary cylindrical member 26 of the fluid slip ring assembly and is provided with a shaft connected to rotatable member 27 of the fluid slip ring assembly for measuring the swing of the manipulator unit about a first axis. Referring to FIGS. 1 and 3, rotary potentiometer 160 is mounted in the shaft pivotally connecting the lower arm member to the rotatable base member for measuring the displacement of the lower arm member relative to the rotatable base member about a second axis. Rotary potentiometer 161 is mounted at the pivotal connection between the upper and lower arms and functions to measure the displacement of the upper arm member relative to the lower arm member about a third axis.

Referring to FIGS. 9 through 12, linear potentiometers 163 and 164 are mounted in recesses in the cylindrical surface of support block 96, having slidable shafts 163a and 164a which are connected to push rods 109 and 108, respectively, through brackets 163b and 164b for measuring the strokes of cylinder rods 120 and 121 and correspondingly the displacement of the member relative to the upper arm member about fourth and fifth axes. As best shown in FIGS. 10 and 11, rotary potentiometer 162 is mounted on end wall 125 of rotary actuator 123, having the shaft thereof connected to vane 128 and actuator output shaft 127 for measuring the rotary displacement of work tool 110 relative to the member. The lead wires from potentiometers 160 through 164 are passed through the member, the upper and lower arm members and the rotatable base member, into the fluid slip ring assembly where they are connected to an electrical slip ring assembly 166 having a portion thereof rotatable with rotatable member 27 of the fluid slip ring assembly and a stationary portion thereof supported on stationary cylindrical member 26. The position signals generated by the potentiometers are converted through an analog/digital converter and fed into the computer in the conventional manner.

The computer may be programmed either by moving the manipulator unit through the sequence of motions desired, or by the use of a hand-held programmer 167.

In programming the computer by physically moving the manipulator unit through the desired sequence of motions, the outer end of the upper arm member and the member are moved through the sequence of motions through the use of detachable handles which may be attached to the end of the upper arm member and the member. To facilitate the movement of such members, valves 94 and 95 are opened to provide intercommunication between the ends of cylinders 88 and 89 and a valve 168 also is opened to equalize the pressure across rotary actuator 123. Under such conditions, the manipulator unit may be swung more easily and the upper and lower arms can be pivoted more easily to permit a smooth motion of the work tool as it is moved through its desired sequence of motions. After the handle programming has been completed, the programming handles can be removed from the upper arm and member to avoid interference with the operation of the unit.

During the handle programming of the unit, the various potentiometers of the manipulator unit generate a sequence of position signals which function to program the computer. Programmer 169 can be utilized to input keyboard data and provide a display for computer output. Such unit is used only for higher levels of programming where there exists a need for a keyboard and a display. In addition, a magnetic tape unit can be connected to the control system and the programs which have been developed by hand programming or otherwise can be transferred to the tape for storage and later use.

Figure 21:
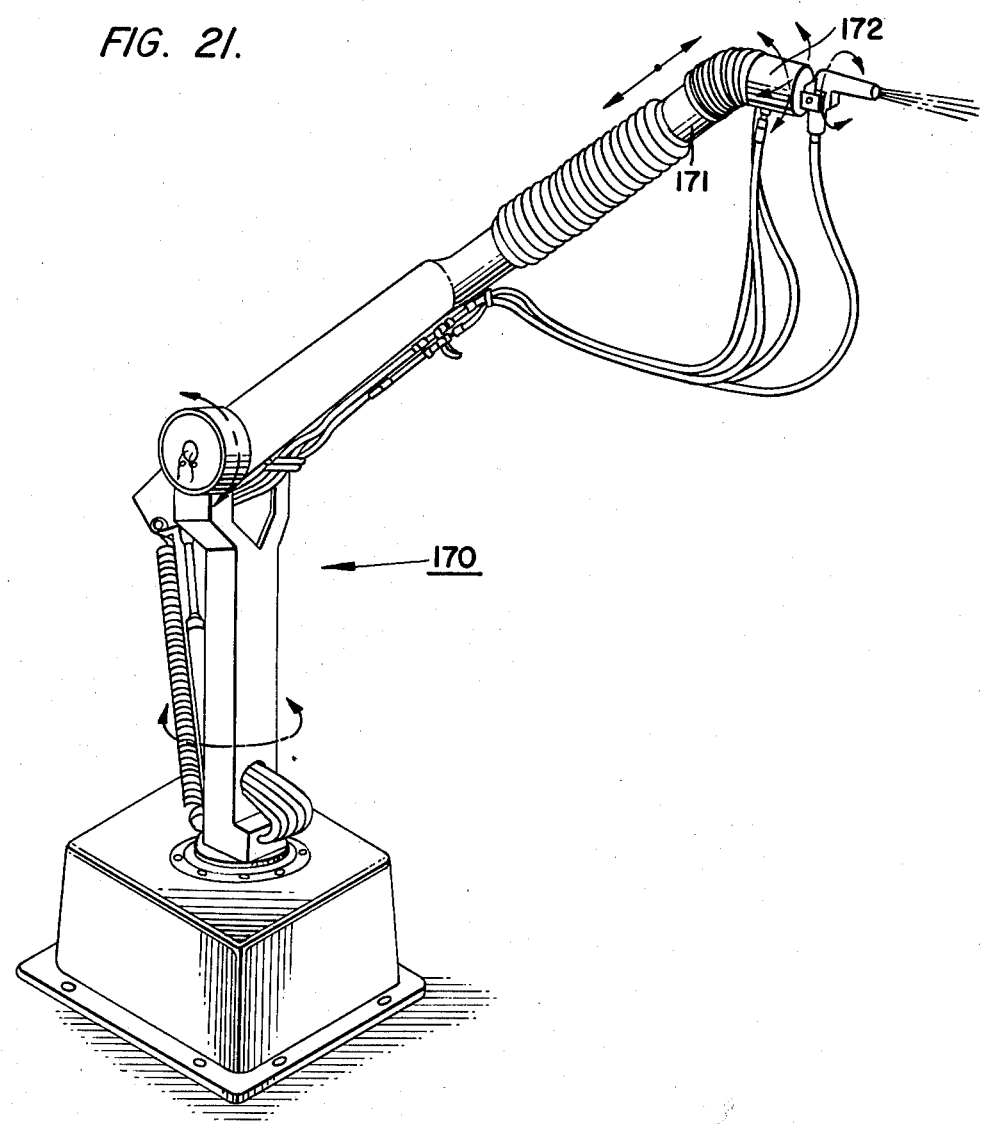
FIG. 21 is a modification of the manipulator unit shown in FIG. 1.
Figure 22:
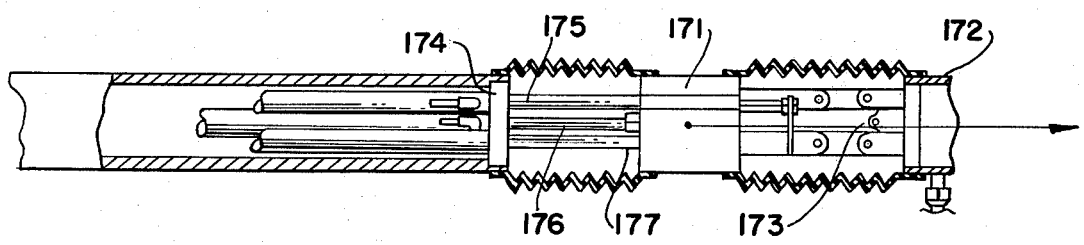
FIG. 22 is a side-elevational view of an arm member of the embodiment shown in FIG. 21, having a portion thereof taken away to expose the interior thereof.

FIGS. 21 and 22 illustrate a modification of the manipulator unit illustrated in FIG. 1. Manipulator unit 170 is substantially identical in construction and operation with respect to manipulator unit 12, except that the lower end of the lower arm member is formed integral with the rotatable base member to eliminate an axis of movement, and the member is extendable. In lieu of a pneumatic cylinder assembly and two hydraulic cylinder assemblies for effecting movement of the member through a push rod arrangement, three hydraulic cylinder assemblies of comparatively longer lengths are used, having the rods thereof universally connected to the member. Furthermore, support block 171 is connected to member 172 through a universal connection 173 and is not rigidly connected with mounting plate 174 so that when cylinder rods 175, 176 and 177 are extended and retracted, the support block will move with the member. It will be appreciated that by extending the rods of such assemblies simultaneously, the member can be extended and by varying the extension of the rods in different combinations, the member can be caused to assume different attitudes. The unit illustrated in FIG. 21 also can operate in either a continuous path mode or a point-to-point mode with movements about five axes. Such modification is intended to be used with a power unit 13 and a control system 14 as described in connection with the embodiment shown in FIG. 1.

The fluid lines of the several embodiments of the invention as described are intended to be disconnectable so that different components of the manipulator units may be readily removed from the manipulator units for servicing or displacement whenever a manipulator unit malfunctions, it is contemplated that the malfunctioning component can be quickly removed by detaching the fluid lines and disconnecting the component, and replaced with a spare component so as to minimize the down time of the unit. Such practice in servicing and maintaining the manipulator units will result in higher productivity of the units and higher quality and reliable workmanship in the servicing of the malfunctioning components at a suitably equipped and staffed service and maintenance facility.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus for performing a work function on a workpiece comprising a stationary base, a rotatable base mounted on said stationary base, a means for rotatably displacing said rotatable base relative to said stationary base, a lower arm member pivotally mounted on said rotatable base, hydraulically actuated means for angularly displacing said lower arm member relative to said rotatable base, an upper arm member pivotally mounted on said lower arm member, hydraulically actuated means for angularly displacing said upper arm member relative to said lower arm member, a wrist assembly mounted on said upper arm member, a hand member universally mounted on said wrist assembly, hydraulically actuated means for angularly displacing said hand member relative to said wrist assembly, said stationary and rotatable bases including a rotary fluid slip ring assembly, said fluid slip ring assembly including a rotatable member rigidly secured to said rotatable base, and a means for transmitting fluid between said stationary base and said hydraulically actuated means through said fluid slip ring assembly for operating said hydraulically actuated means.

2. An apparatus according to claim 1 wherein said fluid transmitting means include fluid lines which are separable to permit the detachment of the lower arm member relative to the rotatable base.

3. An apparatus according to claim 1 wherein said fluid transmitting means include fluid lines which are separable to permit the detachment of the upper arm member relative to the lower arm member.

4. An apparatus according to claim 1 wherein each of said fluid transmitting means includes a valve connectable to a source of fluid under pressure, operable responsive to an input command signal for supplying fluid under pressure to an associated hydraulically actuated means for effecting a selected motion of a component of the apparatus.

5. An apparatus according to claim 1 including means for sensing the position of a movable component thereof relative to another component thereof, means for transmitting said sensed positions and a comparator to which said sensed positions are transmitted.

6. An apparatus according to claim 5 wherein said sensing means is electrical.

7. An apparatus according to claim 6 wherein said sensing means includes a potentiometer.

8. An apparatus according to claim 6 wherein said stationary and rotary bases include an electrical slip ring assembly.

9. An apparatus according to claim 8 wherein said sensing means includes a potentiometer.

10. An apparatus according to claim 1 wherein said hydraulically actuated means for angularly displacing said lower arm member relative to said rotatable base comprises a hydraulic cylinder assembly operatively interconnecting said lower arm member and said rotatable base.

11. An apparatus according to claim 10 including means for selectively intercommunicating the opposite ends of the cylinder of said cylinder assembly.

12. An apparatus according to claim 10 including means for counteracting the action of said hydraulic cylinder assembly to cause said upper arm to balance and assume a steady-state position.

13. An apparatus according to claim 1 wherein said hydraulically actuated means for angularly displacing said upper arm member relative to said lower arm member comprises a hydraulic cylinder assembly operatively interconnecting said arm members.

14. An apparatus according to claim 13 including means for selectively intercommunicating the opposite ends of the cylinder of said hydraulic cylinder assembly.

15. An apparatus according to claim 13 including means for counteracting the action of said hydraulic cylinder assembly to cause said upper arm to balance and assume a steady-state position.

16. An apparatus according to claim 5 including a hydraulically powered rotary actuator mounted on said hand member for mounting said work tool.

17. An apparatus according to claim 1 wherein said rotary fluid slip ring assembly comprises a first member mounted on said stationary base and a second member cooperating with said first member mounted on said rotatable base for rotation therewith and wherein each of said fluid transmitting means includes a port in one of said first and second cooperating members communicating exclusively with an annular recess in the other of said cooperating members.

18. An apparatus according to claim 17 wherein said second member comprises a member depending from said rotatable base and received within said stationary base, having an outer cylindrical surface provided with a plurality of axially spaced grooves, and wherein said first member comprises a member supported on said stationary member, having an inner cylindrical surface disposed in opposed relation to the cylindrical surface of said second member, provided with a plurality of axially spaced ports communicating with said annular grooves, defining portions of said fluid transmitting means.

19. An apparatus according to claim 18 wherein said means for rotatably displacing said rotatable base relative to said stationary base comprises a hydraulically powered rotary motor mounted on said stationary base drivingly connected to the depending member of said rotary base.

20. An apparatus according to claim 1 including a set of annular seals disposed between said cooperating members for sealing each set of intercommunicating ports and annular recesses.

21. An apparatus according to claim 1, 5, 10, 13, 16, 17 or 20 wherein said fluid slip ring assembly includes a stationary member and a rotatable member positioned in said stationary member.

22. An apparatus according to claim 21 wherein said rotatable base is rigidly secured on top of said rotatable member.

23. An apparatus according to claim 1 further comprising means disposed on said hand member for mounting a work tool.

24. An apparatus for performing a work function on a workpiece comprising a stationary base, a rotatable base mounted on said stationary base, means for rotatably displacing said rotatable base relative to said stationary base, a lower arm member pivotally mounted on said rotatable base, hydraulically actuated means for angularly displacing said lower arm member relative to said rotatable base, an upper arm member pivotally mounted on said lower arm member, hydraulically actuated means for angularly displacing said upper arm member relative to said lower arm member, a wrist assembly mounted on said upper arm member, a hand member universally mounted on said wrist assembly, hydraulically actuated means for angularly displacing said hand member relative to said wrist assembly including one or more push rods each operatively connected to said wrist member and to said hand member, means for displacing each said push rod, means disposed on said hand member for mounting a work tool, said stationary and rotatable bases including a rotary fluid slip ring assembly, and means for transmitting fluid between said stationary base and said hydraulically actuated means through said fluid slip ring assembly for operating said hydraulically actuated means.

25. An apparatus for performing a work function on a workpiece comprising a stationary base, a rotatable base mounted on said stationary base, means for rotatably displacing said rotatable base relative to said stationary base, a lower arm member pivotally mounted on said rotatable base, hydraulically actuated means for angularly displacing said lower arm member relative to said rotatable base, an upper arm member pivotally mounted on said lower arm member, hydraulically actuated means for angularly displacing said upper arm member relative to said lower arm member, a wrist assembly mounted on said upper arm member, a hand member universally mounted on said wrist assembly, said wrist assembly including two or more hydraulically linearly actuated means for angularly displacing said hand member relative to said upper arm member about separate axes, each said means being mounted on said wrist member, means disposed on said hand member for mounting a work tool, said stationary and rotatable bases including a rotary fluid slip ring assembly, and means for transmitting fluid between said stationary base and said hydraulically actuated means through said fluid slip ring assembly for operating said hydraulically actuated means.

26. An apparatus for performing a work function on a workpiece comprising a stationary base, a rotatable base mounted on said stationary base, means for rotatably displacing said rotatable base relative to said stationary base, a lower arm member pivotally mounted on said rotatable base, hydraulically actuated means for angularly displacing said lower arm member relative to said rotatable base, an upper arm member pivotally mounted on said lower arm member, hydraulically actuated means for angularly displacing said upper arm member relative to said lower arm member, a wrist assembly mounted on said upper arm member, a hand member connected to said wrist assembly, said wrist assembly including universal connection means, a first means connected to said hand member through said universal connection means for angularly displacing said hand member relative to said upper arm member about a first axis, and a second means connected to said hand member through said universal connection means for angularly displacing said hand member about said first axis and about a second axis, said stationary and rotatable bases including a rotary fluid slip ring assembly, and means for transmitting fluid between said stationary base and said hydraulically actuated means through said fluid slip ring assembly for operating said hydraulically actuated means.

27. An apparatus according to claim 26 wherein said second means comprises third and fourth means each operatively engageable with said hand member, operable simultaneously to angularly displace said hand member relative to said upper arm member about said first axis and operable independently to angularly displace said hand member relative to said wrist assembly about a second axis.

28. An apparatus according to claim 26 or 27 further comprising means disposed on said hand member for mounting a work tool.

29. An apparatus according to claim 26 wherein said first and second means are hydraulically actuated.

30. An apparatus for performing a work function on a workpiece comprising a stationary base, a rotatable base mounted on said stationary base, means for rotatably displacing said rotatable base relative to said stationary base, a lower arm member pivotally mounted on said rotatable base, hydraulically actuated means for angularly displacing said lower arm member relative to said rotatable base, an upper arm member pivotally mounted on said lower arm member, hydraulically actuated means for angularly displacing said upper arm member relative to said lower arm member, a wrist assembly mounted on said upper arm member, a hand member connected to said wrist assembly, said wrist assembly including universal connection means, a first means mounted directly on said upper arm member and directly connected to said hand member through said universal connection means for angularly displacing said hand member relative to said upper arm member about a first axis, and a second means mounted directly on said upper arm member through said universal connection means for angularly displacing said hand member relative to said upper arm member about at least a second axis, said stationary and rotatable bases including a rotary fluid slip ring assembly, and means for transmitting fluid between said stationary base and said hydraulically actuated means through said fluid slip ring assembly for operating said hydraulically actuated means.

31. An apparatus according to claim 30 wherein said first and second means are hydraulically actuated.

32. An apparatus according to claim 30 further comprising means disposed on said hand member for mounting a work tool.

* * * * *